United States Patent [19]

Hirakawa et al.

[11] 4,304,315
[45] Dec. 8, 1981

[54] TRACTOR

[75] Inventors: Kenkichi Hirakawa, Sakai; Toshiyuki Matsumoto, Yao, both of Japan

[73] Assignee: Kubota, Ltd., Japan

[21] Appl. No.: 81,827

[22] Filed: Oct. 4, 1979

[30] Foreign Application Priority Data

Dec. 5, 1978 [JP] Japan ............................ 53-168244[U]

[51] Int. Cl.³ ............................................ B62D 21/10
[52] U.S. Cl. .................................. 180/89.1; 180/54 D; 180/90.6; 280/164 R
[58] Field of Search .............. 296/190; 180/89.1, 90.6, 180/182, 54 D; 280/727, 748, 752, 163, 164 R, 289 G

[56] References Cited

U.S. PATENT DOCUMENTS

| | | | |
|---|---|---|---|
| 973,856 | 10/1910 | Chandlee | 180/90.6 |
| 1,247,996 | 11/1917 | Parker | 180/90.6 |
| 1,941,801 | 1/1934 | Harley | 280/289 G |
| 2,171,042 | 8/1939 | Minton | 280/289 G |
| 3,311,183 | 3/1967 | Phillips | 180/54 D |
| 3,622,175 | 11/1971 | Benz | 180/182 |
| 3,644,704 | 2/1972 | Polly | 180/182 |
| 3,648,797 | 3/1972 | Lukens | 180/89.1 |
| 3,743,316 | 7/1973 | Stotesbery | 180/182 |
| 3,831,704 | 8/1974 | Zuege | 180/89.1 |

FOREIGN PATENT DOCUMENTS 172354 10/1916 Canada ............................ 180/90.6

Primary Examiner—Joseph F. Peters, Jr.
Assistant Examiner—John A. Carroll
Attorney, Agent, or Firm—Kane, Dalsimer, Kane, Sullivan and Kurucz

[57] ABSTRACT

A tractor is provided with a clutch case, a transmission case at the rear side of this clutch case and left and right steps attached to these cases. A frame is transversely extended from said clutch case. Foot covers are attached to said frame and said foot covers.

6 Claims, 4 Drawing Figures

TRACTOR

BACKGROUND OF THE INVENTION

The present invention relates to a tractor provided with a clutch case, a transmission case at the back of this clutch case and left and right steps attached to these cases.

A conventional tractor of this kind has not been provided with a cover for protecting the feet of the tractor operator. Such conventional tractor has therefore involved a risk in that, in case the tractor is turned over, the foot of the tractor operator might be caught between the outside end of the step and the ground.

Furthermore, such conventional tractor has a defect that, when the tractor travels on a muddy ground, the operator's feet are splashed with mud.

SUMMARY OF THE INVENTION

It is an object of the present invention to provide a tractor which may overcome such conventional defects as above-mentioned.

A tractor according to the present invention is provided with a clutch case, a transmission case at the back of this clutch case and left and right steps attached to these cases, and is characterized by a frame transversely extended from the front upper portion of the clutch case and by foot covers attached to the front sides of the steps and to the frame.

Thus, the tractor according to the present invention has advantages that such foot covers can prevent the operator's feet from striking against something outside in case the tractor is turned over, and also from being splashed with mud or the like.

Furthermore, such foot covers are not merely attached to the tractor but the attachment of such covers are reinforced by the frame mounted to the clutch case, thereby to reinforce the strength of the whole structure. Therefore, higher safety may be obtained as compared with the structure in which the foot covers are attached merely to the steps.

In the case a safety frame for protecting the upper body of the operator is attached to the tractor, the transversely extended frame may reinforce the attachment of such safety frame.

Other objects and advantages of the present invention will be apparent from the following detailed description.

DETAILED DESCRIPTION OF THE PREFERRED EMBODIMENTS

Figure 1:
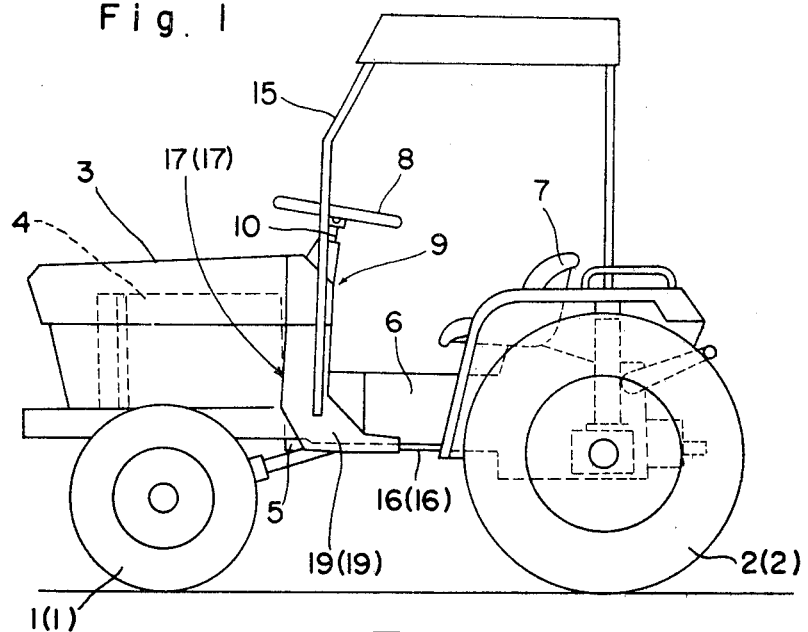
FIG. 1 is a side view of a tractor according to the present invention.
Figure 2:
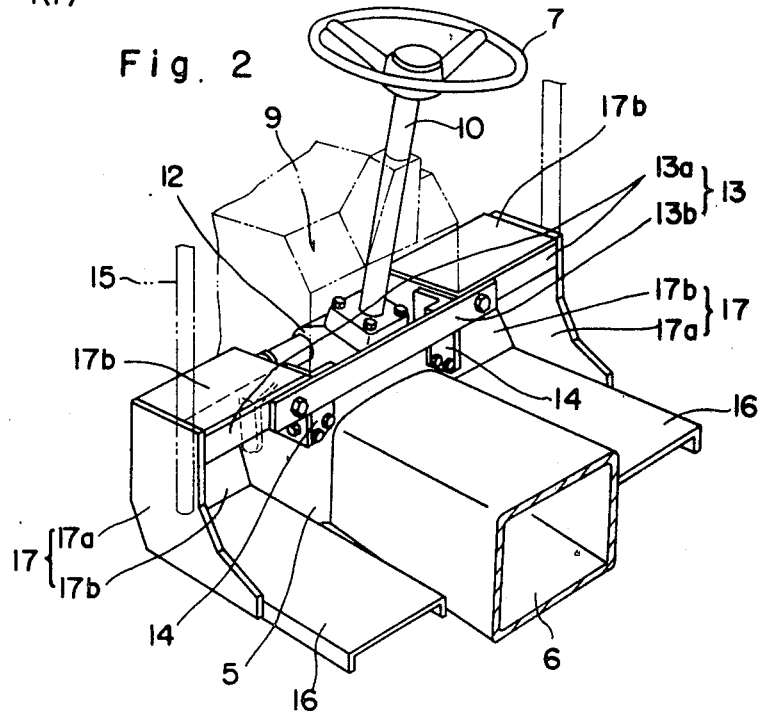
FIG. 2 is a perspective view showing the mounting portion of a safety frame mounting frame in the tractor in FIG. 1.
Figure 3:
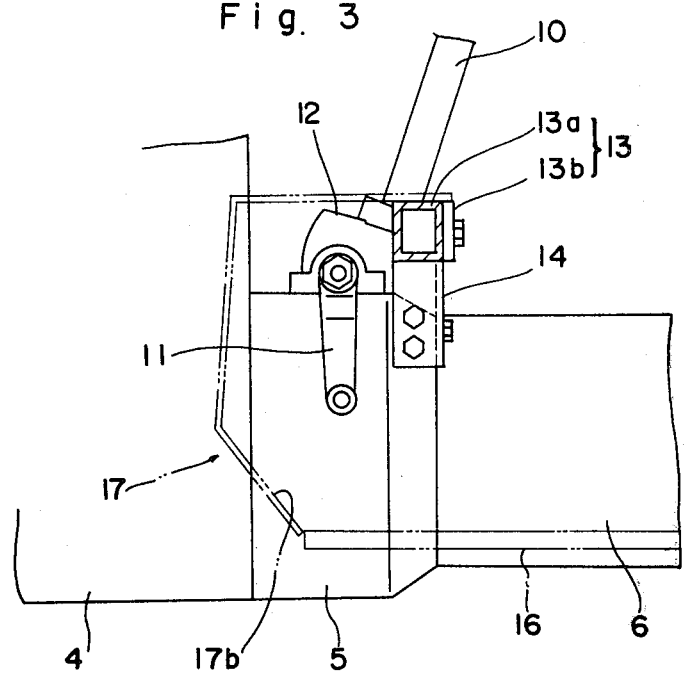
FIG. 3 is a longitudinal section view of main portions in FIG. 2.

In FIG. 1, a tractor to be mainly used for agricultural purposes comprises a pair of steering front wheels 1, a pair of rear wheels 2, a front engine 4 covered with a bonnet 3, a clutch case 5 directly coupled to the rear side of this engine 4, a transmission case 6 directly coupled to the rear side of this clutch case 6, a steering seat 7, a steering wheel 8 and an operation panel 9 disposed at the rear end of the bonnet 3.

Power from the engine 4 is adapted to be transmitted into the transmission case 6 through travelling clutch means (not shown) in the clutch case 5, and thus transmitted power is adapted to be suitably changed in speed by a gear-type speed change mechanism (not shown) in the transmission case 6 and then further transmitted to the front and rear wheels 1 and 2.

Disposed on the clutch case 5 is a steering case 12 incorporating a worm mechanism (not shown) which is adapted to convert the rotation of the rotary shaft 10 of the steering wheel 8 into the forward/rearward swing movement of a Pitman arm 11. Further disposed on the clutch case 5 is a safety frame mounting frame 13 transversely extending in the both directions. This steering case 12 and this safety frame mounting frame 13 are couplingly supported by the clutch case 5.

The mounting frame 13 comprises a pair of end frame portions 13a in the square pipe shape extending in the transverse direction, and a plate-shape intermediate frame portion 13b connecting the end frame portions 13a to each other. These end frame portions 13a are bolted to a pair of coupling brackets 14, which are bolted to the clutch case 5. Thus, the end frame portions 13a are couplingly supported by the clutch case 5.

The intermediate frame portions 13b is joined to the rear sides of the end frame portions 13a. A space for housing at least a portion of the steering case 12 is provided between the end frame portions 13a and at the front side with respect to the intermediate frame portion 13b. Thus, the steering case 12 is disposed as fitted into the mounting frame 13.

Steps 16 are attached to the clutch case 5 and the transmission case 6.

The mounting frame 13 is also utilized for couplingly supporting a safety frame 15 and foot covers 17; said safety frame 15 is formed in the arch shape when viewed from the front and for covering the steering seat 7 from the above, and said foot covers 17 extend upwardly from the front ends of the steps 16 located at the both lateral sides under the steering seat 7. That is, the foot covers 17 are attached both to the steps 16 and the mounting frame 13.

The foot covers 17 comprise front plates 17b attached to the front ends of the steps 16 and to the mounting frame 13, and lateral plates 17a attached to the front lateral sides of the steps 16 and to the ends of the mounting frame 13.

According to another embodiment of such mounting frame 13, as a space for housing the steering case 12 a notch may be formed in the mounting frame 13 formed from a single pipe.

Figure 4:
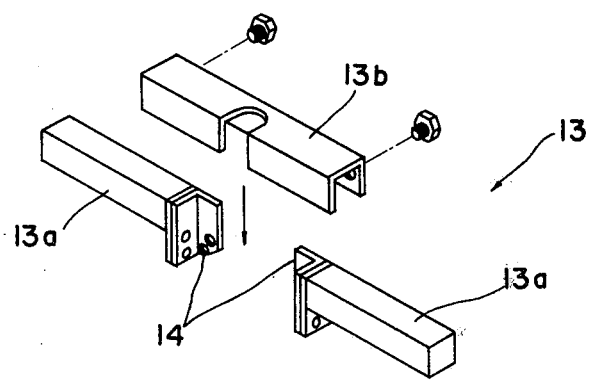
FIG. 4 is a disassembled perspective view of main portions in another embodiment of the present invention.

Furthermore, when the mounting frame 13 is constituted by three frame portions 13a and 13b as in the case of the embodiment discussed hereinbefore, as the intermediate frame portion 13b a frame having a reverse U-shape section as shown in FIG. 4 may be used in such a manner as to cover the steering case 12 from the above.

We claim:

1. A step structure for a tractor having a clutch case and a transmission case disposed rearwardly of said clutch case, said step structure comprising:

right and left steps attached to lower lateral portions of said clutch case and said transmission case so as to project transversely therefrom;

a frame projecting transversely from an upper forward portion of said clutch case; and foot covers each extending from said frame to one of said steps, each of said foot covers including a lateral plate interconnecting a lateral forward side of one of said steps and a projecting end of said frame; and a front plate interconnecting a forward end of one of said steps, a projecting portion of said frame, and said lateral plate.

2. A tractor as set forth in claim 1 wherein said frame includes a right and left pair of projecting frame portions each having a pipe-like shape, and a plate-like intermediate frame portion interposed between said projecting frame portions.

3. A tractor as set forth in claim 2, further comprising a pair of coupling brackets connecting said clutch case to said pair of frame portions.

4. A tractor as set forth in claim 3, wherein there is provided a space for housing at least a portion of steering case at the front side with respect to said intermediate frame portion, said space defined by said pair of frame portions said intermediate frame portion and said foot covers.

5. A tractor as set forth in claim 4, wherein said intermediate frame portion is constituted by a frame having a reverse U-shape section.

6. A tractor as set forth in claim 5, further comprising a safety frame for protecting the tractor operator attached to said pair of frame portions.

* * * * *